3,019,128
COATED CARBONACEOUS ARTICLES
William D. Smiley, Palo Alto, Calif., assignor, by mesne assignments, to Union Carbide Corporation, New York, N.Y., a corporation of New York
Filed Sept. 17, 1957, Ser. No. 684,410
4 Claims. (Cl. 117—71)

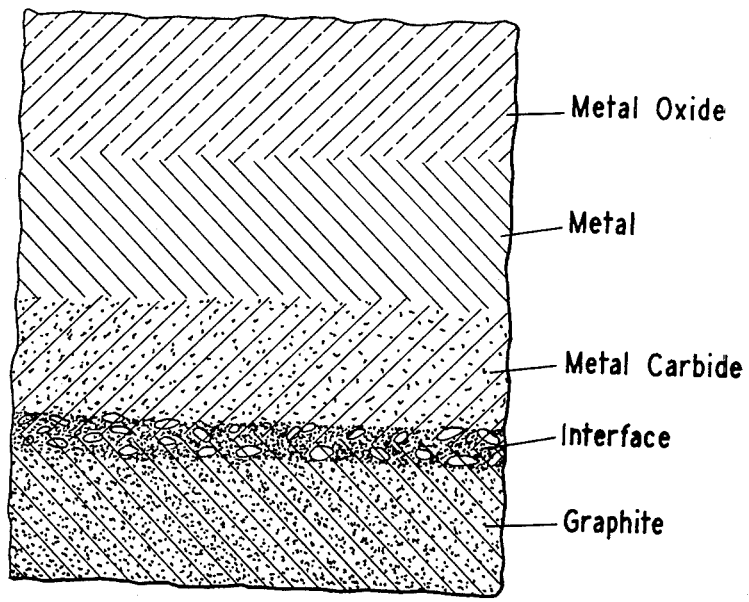

This invention relates to carbonaceous articles having bonded thereto refractory coatings, and more particularly relates to coatings for carbonaceous articles which are highly resistant to oxidation and erosion at high temperatures, and to a method of applying such coatings to carbonaceous articles.

The term "refractory" as used herein is defined as the capacity of a material to resist oxidation and erosion at high temperatures. In particular, it refers to resistance of a material against oxidation and erosion at temperatures in excess of the oxidation temperatures of carbon and graphite.

The term "erosion" refers both to thermal erosion by sublimation or vaporization, and to mechanical erosion wherein particles of a material are separated principally through physical rather than thermal force.

The term "carbonaceous article" as used herein is intended to include articles composed of carbon or graphite or partially graphitized carbon.

The term "metal" as used herein and in the claims is intended to include elemental silicon.

It is well known that carbonaceous materials such as elemental carbon and graphite have some properties valuable for a refractory. However, carbonaceous materials are limited in use as a refractory by a relatively low oxidation and erosion resistance. For example, carbon or graphite in the presence of an oxygen-rich atmosphere oxidizes or burns at temperatures of red heat, usually about 450° C., and erodes at such temperatures rapidly, particularly when exposed to a high velocity, oxidizing blast at high temperatures. Such is the case for example when carbon or graphite is exposed to an oxy-acetylene or oxy-kerosene flame jet. If not for these disadvantages, carbon or graphite could well prove to be superior for many high temperature refractory uses such as for nozzles of rocket motors and ram-jets, flame deflectors and nuclear moderators. Presently, more costly and less available materials are employed.

Illustratively, the art of liquid propellant rocket nozzles has long recognized that carbonaceous materials would offer long sought refractory and heat transfer properties for use as rocket and ram-jet nozzles if the oxidation and erosion resistance of the materials could be improved. For example, the most serious disadvantage of rocket nozzles made from graphite is that the nozzles erode very rapidly under the thermal and mechanical forces of the high temperature flame blast of the rocket and particularly erode rapidly at the throat area of the nozzles. This dimensional instability of the nozzles is particularly disadvantageous inasmuch as it renders the nozzles incapable of producing a controlled thrust.

Attempts and proposals have been made before to improve the dimensional stability of carbonaceous materials. Such attempts and proposals have been largely confined to developing suitable refractory coatings for articles of carbonaceous materials. For example, attempts were made to coat carbon and graphite articles with refractory "metal carbide" coatings such as, for example, coatings of silicon carbide, titanium carbide and aluminum carbide. These coatings were obtained by impregnating the pores of carbon or graphite articles in at least the surface portions thereof with a carbide-forming metal, thereby providing a bonded metal carbide coating. However, such coatings have not proved favorable under high temperature use because of the high percentage of carbon present at the surface of the coatings. The coatings oxidized and eroded, pitted and exposed the surface of the article underneath the coating to oxidation. This oxidation of the carbon article underneath the coatings is commonly called "undermining" and caused the coatings to peel and chip.

Other alternatives have been proposed among which include coating carbonaceous articles with a refractory oxide. To this end, attempts have been made in the past to impregnate the oxide, preferably a metal oxide, within the pores of the carbonaceous article. Such attempts failed principally because the oxide could not be made to "wet" the carbonaceous pores of the article.

In the alternative, the practice heretofore has become to mix particles of an oxide with carbonaceous particles, mold the mix and bake the molded article to provide an oxide protected carbonaceous article. Such articles have, however, proven unfavorable under conditions of high temperature because the carbon-rich surface of the article rapidly oxidized. Moreover, such articles exhibit a rather low resistance to thermal shock.

It is the principal object of this invention to provide carbon or graphite articles protected against oxidation and erosion at high temperature, which articles are free of the disadvantages of prior materials. Another object is a method of producing such articles.

According to the present invention by means of which these objects are attained, there is provided a carbonaceous article having bonded thereto a coating which is highly refractory in the presence of a high temperature oxygen-rich atmosphere. More specifically, the invention provides carbonaceous articles having bonded thereto a coating comprising a layer of an oxidizable metal bonded to the surface of the carbonaceous article through an intermediate surface impregnated layer of metal carbide, the metal layer of said coating being substantially free of carbon and readily convertible to a refractory metal oxide in the presence of an oxygen-rich atmosphere.

The carbonaceous article of the invention may be prepared by melting an oxidizable, carbide-forming metal in contact with the surface of the carbonaceous article in an inert atmosphere, maintaining the temperature of the molten metal up to at least the carbide reaction temperature of the metal to promote wetting and impregnation of the surface portions of the carbonaceous article and impregnating the surface of the carbonaceous article at a temperature of at least the carbide reaction temperature of the metal. Impregnation is allowed to proceed for a predetermined duration sufficient to retain a layer of unreacted oxidizable metal at the surface of the coating and is then retarded by reducing the temperature of impregnation substantially below the metal carbide reaction temperature of the metal.

An alternate method for applying an oxidizable metal coating to a carbonaceous article comprises melting the carbide-forming metal in contact with the surface of the carbonaceous article as described, promoting impregnation of the molten metal within the pores of the carbonaceous article for a duration sufficiently long to complete the conversion of the metal to the metal carbide, thereby cohesively bonding a layer of metal carbide to the surface of the carbonaceous article, and subsequently fusing a layer of an oxidizable metal to the so-formed layer of metal carbide. This procedure is suitable in cases where the metal to metal carbide reaction of the metal used proceeds so rapidly that the reaction cannot be practically controlled and retarded to retain the oxidizable metal layer, or if it is desired to provide an oxidizable layer of dissimilar metal from that used to produce the metal carbide layer of the coating.

The metal used in the practice of the invention may be any metal generally characterized, first, by its ability to react with carbon to form a metal carbide and second, by its ability to form a highly refractory metal oxide when exposed to an oxygen-rich atmosphere. Among such metals are silicon, titanium and zirconium. Of the metals listed, the most generally preferred is zirconium, inasmuch as zirconium forms one of the most refractory metal oxides known. For conciseness, then, the method of the invention will be herein further described with particular reference to the use of zirconium in the practice of the invention.

The accompanying drawing is a schematic elevation in section of a coated carbonaceous article.

Referring to this drawing it is seen that a piece of graphite has an initial coating of a metal carbide thereon in which carbide fills substantially all the pores in the graphite surface. The metal carbide has a complete coating of the metal constituent of the metal carbide thereon, and a metal oxide coating completely covering the metal so as to expose only a metal oxide surface on the finished article. The metal oxide should be the oxide of the metal constituent of the metal carbide. For example, graphite can be covered with successive layers of zirconium carbide, zirconium and zirconium oxide.

The conditions and limitations necessary to the practice of the method of the invention will be apparent from following description. Generally, pieces or particles of zirconium or other selected metal, such as pieces of sheet, sponge or lathe turnings are placed in contact with the carbonaceous material to be treated and are melted and impregnated within the pores of the carbonaceous article at its surface portions. The size of the pieces of metal is not critical and is generally limited only by the size of the carbonaceous article to be coated, that is to say, the pieces of metal should be of a size sufficient to provide complete coverage of the surface of the article. Any manner by which the pieces can be confined to the surface of the article when melted may be suitable. As an example, in the instance of coating the chamber and throat area of a carbonaceous rocket nozzle, it has been found that the best practice to follow is to place the pieces of zirconium metal within and in contact with the surface of the nozzle and plug the ends of the nozzle suitably. The nozzle is then placed in a furnace. When the pieces of zirconium metal are melted, the metal by a "wetting" action covers the surface of the article and impregnates within the pores of the carbonaceous material.

Experience has shown, in the case of zirconium that a charge of zirconium metal approximately equivalent to one ounce per 100 square inches of surface area to be covered (including the end plugs in the case of a rocket nozzle) is sufficient to coat the surface completely without leaving any excess of metal. The charge, of course, will depend on the metal used and the average pore size of the carbonaceous material. The effect of the latter will be discussed below.

The article to be treated and the metal to be applied to it are placed in a suitable furnace. The furnace may be a graphite tube high temperature resistance furnace or induction furnace having a volume capacity sufficient to receive the stock to be coated. The heating capacity of the furnace generally depends at least upon the carbide reaction temperature of the metal used. For example, where zirconium is used, the heating range of the furnace should be from room temperature up to at least 2200° C. In order to prevent contamination of the coating, the atmosphere in the furnace must be inert to the article being treated and the metal being applied. When zirconium metal is used in the practice of the invention, the preferred atmosphere is that of helium gas. Argon gas may also be used, or coating may be accomplished by heating in a vacuum.

It will be evident, of course, that uniform penetration of the molten metal is in part dependent upon the permeability of the material or, more specifically, the pore size and number of pores of the carbonaceous material open to the molten metal during impregnation. If the pore size of the material to be treated is not large enough to absorb the molten metal or if the pores are too large permitting rapid absorption of the molten metal, satisfactorily uniform impregnation can not be achieved. As an example of operable pore sizes of carbon or graphite material to be used, investigations utilizing a series of pore volume spectrums covering the size range of pores in given grade samples have shown that the coating will be satisfactorily bonded to a carbon or graphite article if the average pore size of the material is within the range of from about 1.5 microns to about 0.15 micron.

Initiating impregnation of the molten metal within the pores of the carbonaceous article is dependent upon the temperature of the metal. Since most molten metals will not wet carbon or graphite until the metal reacts to form the metal carbide, impregnation generally will proceed only at temperatures above the carbide reaction temperature of the metal. In the case of zirconium, this temperature is between about 1850° C. and 1900° C.

As the temperature of impregantion is increased above the carbide reaction temperature of the metal, the rate of metal to metal carbide conversion increases proportionately. This increase generally proceeds until a temperature is reached at which the molten metal is substantially instantaneously converted to the metal carbide. For example, molten zirconium metal will more rapidly react to form zirconium carbide at a temperature of 1950° C. than at about 1900° C. and will be substantially instantaneously converted to zirconium carbide at a temperature of about 2100° C., while in the case of titanium the reaction takes place rapidly at about 1700° C., and in the case of silicon at about 1500° C.

The depth of impregnation of the molten metal and also the thickness of the coating is further dependent upon the temperature of impregnation. The depth of impregnation increases and conversely the thickness of the coating decreases with increased temperature.

Sinec some metals, as before mentioned, react with the carbon or graphite very rapidly, it is difficult to control the metal carbide reaction with most grades of carbon and graphite so that the unreacted metal layer of the coating may be retained. For example, it has been found that titanium when used in the practice of the invention reacts very rapidly with carbon or graphite. When such metals are used, a very dense grade of graphite say one having an average pore size of about 0.15 micron is useful so that the rate of impregnation of the metal and hence that of the reaction is substantially decreased.

As impregnation proceeds at constant temperature, the amount of metal carbide formed in the reaction increases with time. When the reaction has proceeded long enough, all of the metal will be converted to the metal carbide. For example, when zirconium metal is impregnated within the pores of carbon or graphite at a temperature of about 1900° C., zirconium will be completely converted to zirconium carbide, after a duration of impregnation of about 30 minutes.

Generally this may be accomplished in either of two ways; first, by permitting the reaction to proceed at constant temperature for a period of time insufficient to allow complete conversion of the metal to carbide and then retarding the reaction, or second, by increasing the temperature for a limited period and then quickly quenching the reaction. The more preferred practice is the former method. Of course, if a metal carbide surface is produced, additional metal can be applied over it to produce a substantial carbide-free coating of metal.

It has been found that surface coatings of metal in accordance with the invention having a thickness within the range of from about 30 to 75 microns applied to an article impregnated with metal carbide to about 90 to 150 microns are suitable for refractory protection of carbon or graphite articles. This may easily be obtained by properly controlling the metal carbide reaction as above described. These coatings exhibited good refractory properties at temperatures as high as 2500° C.

Coatings produced on carbonaceous articles in the manner of the invention are highly refractory. Perhaps the most striking phenomenon observed during tests of carbon and graphite articles treated in accordance with the invention is that they exhibit a glass-like oxide surface when exposed to an oxidizing atmosphere. This surface is free of carbon and is extremely refractory and resistant to erosion. It is believed that this glass-like oxide surface actually flows within minute limits when exposed to an oxidizing, high temperature, blast providing what might be called a refractory self-sealing oxide film on the coating.

In one example of the practice of the invention, a miniature graphite rocket nozzle was prepared and coated with a zirconium carbide-zirconium coating. The graphite rocket nozzle was machined to an inside throat diameter of about 0.375 inch. The nozzle had a surface area to be treated of about 2.3 square inches. Approximately 0.07 ounce of zirconium turnings were confined within the rocket nozzle and the ends of the nozzle were sealed by plugs. The nozzle was then inserted within a graphite tube resistance furnace which was then purged with an inert atmosphere of helium and heated at a rapid rate to about 1900° C. The zirconium metal at this temperature melted and uniformly wet and impregnated within the pores of the graphite rocket surface. The temperature of the nozzle was maintained at about 1900° C. for about one minute. The nozzle was then cooled quickly to room temperature. It was estimated that at this temperature and duration of impregnation a zirconium carbide-zirconium coating having a thickness of about 75 microns with an oxidizable metal layer thickness of about 20 microns had been bonded to the nozzle surface. It was obesrved upon removal of the nozzle that the inner nozzle throat surface was coated with an unreacted layer of zirconium metal. The nozzle was then tested wtih an oxy-acetylene flame jet at a temperature of about 2500° C. The flame jet blast was directed against the nozzle surface for approximately 120 seconds. After the test, it was observed that the unreacted zirconium metal layer of the coating had been converted to a refractory zirconium oxide surface. It was further observed that the zirconium oxide surface showed only slight effects of oxidation or erosion.

In another example of the invention, a miniature graphite nozzle was coated with zirconium carbide-zirconium. The throat of the graphite nozzle was machined to an inside diameter of about 0.375 inch. The nozzle had a surface area of about 2.3 square inches. Approximately 0.07 ounce of zirconium turnings were confined within the rocket nozzle, and the ends of the nozzle were sealed by plugs. The nozzle was then inserted within a graphite tube resistance furnace which was then purged with an inert atmosphere of helium and heated at a rapid rate to about 2050° C. The zirconium metal at this temperature melted and uniformly wet and impregnated within the pores of the graphite rocket surface. The temperature of the nozzle was maintained at about 2050° C. for about twenty-five minutes. The nozzle was then cooled to room temperature. It was estimated that at this temperature and duration of impregnation a zirconium carbide coating having a thickness of about 30 microns had been bonded to the nozzle surface. The coating step was repeated using a second charge of 0.07 ounce of zirconium turnings. The nozzle was fired to about 1900° C. for about one minute. The nozzle then had a coating with an oxidizable metal layer at the surface. The nozzle was then tested with an oxy-acetylene flame jet at a temperature of about 2400° C. The flame blast was directed against the nozzle surface for approximately 180 seconds. After the test, it was observed that the zirconium layer had been converted to a refractory zirconium oxide surface. It was further observed that the zirconium oxide surface showed only slight effects of oxidation or erosion.

In another example of the invention, a miniature graphite rocket nozzle was coated with titanium carbide having some unreacted titanium present. The throat of the graphite nozzle was machined to an inside diameter of about 0.375 inch. The nozzle had a surface area of about 2.3 square inches. Approximately 0.07 ounce of titanium sheet were confined within the rocket nozzle, and the ends of the nozzle were sealed by plugs. The nozzle was then inserted within a graphite tube resistance furnace which was then purged with an inert atmosphere of helium and heated at a rapid rate to about 1750° C. The titanium metal at this temperature melted and uniformly wet and impregnated within the pores of the graphite surface. The temperature of the nozzle was maintained at about 1750° C. for about one minute. The nozzle was then cooled quickly to room temperature. The nozzle was then tested with an oxyacetylene flame jet at a temperature of about 2020° C. The flame blast was directed against the nozzle surface for approximately 120 seconds. After the test, it was observed that there had been no appreciable change in throat diameter.

In another example of the invention, a miniature graphite rocket nozzle was coated with silicon carbide-silicon. The throat of the graphite nozzle was machined to an inside diameter of about 0.375 inch. The nozzle had a surface area of about 2.3 square inches. Approximately 0.07 ounce of silicon granules were confined within the rocket nozzle, and the ends of the nozzle were sealed by plugs. The nozzle was then inserted within a graphite tube resistance furnace which was then purged with an inert atmosphere of helium and heated at a rapid rate to about 1750° C. The silicon metal at this temperature melted and uniformly wet and impregnated within the pores of the graphite rocket surface. The temperature of the nozzle was maintained at about 1750° C. for about 20 minutes. The nozzle was then cooled quickly to room temperature. At this temperature and duration of impregnation a silicon carbide-silicon coating had been bonded to the nozzle surface. The nozzle was then tested with an oxy-acetylene flame jet at a temperature of about 2040° C. The flame blast was directed against the nozzle surface for approximately 300 seconds. After the test, it was observed that the silicon had been converted to a glassy surface. There was no erosion of the nozzle throat.

In contrast to the test results reported in each of the examples just described, a similar miniature rocket nozzle composed of graphite having an unprotected surface exhibited extreme erosion in the nozzle throat after being subjected to a flame blast of 300 seconds at a temperature of about 2100° C.

It will be evident from the foregoing that the invention provides carbon and graphite articles protected against oxidation and erosion at temperatures above 2000° C. and that the process of the invention is easily practiced. It should also be apparent that the specific examples described in detail herein are illustrative of the principles of the invention only and that modification in procedures and articles may be undertaken without departing from such principles. For instance, as above stated, a coating of an oxidizable metal other than that used to form the metal carbide may be applied to the metal carbide layer.

I claim:

1. An article protected against severe oxidation and erosion which comprises a carbonaceous core; the carbide of a refractory metal in substantially all the pores of the exposed surface of said core, said metal carbide substantially completely covering the exposed surface of said core; a coating of said refractory metal completely covering said metal carbide and any of the surface of said core which is exposed through said carbide, said metal being free of all metal carbide on the surface thereof; and a glass-like coating of a refractory oxide of said refractory metal totally covering said metal; each of said coating layers being bonded to the materials immediately adjacent thereto, said protected article exhibiting only the refractory metal oxide material as its exposed surface.

2. An article as defined in claim 1 wherein said metal is selected from the group consisting of zirconium, titanium and silicon.

3. An article as defined in claim 1 wherein said metal is zirconium.

4. An article adapted to be protected against severe oxidation and erosion which comprises a carbonaceous core; silicon carbide in substantially all the pores of the exposed surface of said core and substantially completely covering said surface; and a metallic silicon coating completely covering all of said silicon carbide and any surface portions of said core which may be exposed through said carbide, said silicon coating being totally free of silicon carbide and carbon, said silicon carbide and said silicon each being bonded to the materials immediately adjacent thereto, said silicon surface adapted to be oxidized to a glass-like quality upon exposure thereof to a high temperature oxidizing atmosphere.

References Cited in the file of this patent
UNITED STATES PATENTS

| | | |
|---|---|---|
| 2,527,513 | Arditi et al. | Oct. 31, 1950 |
| 2,614,947 | Heyroth | Oct. 21, 1952 |
| 2,636,856 | Suggs et al. | Apr. 28, 1953 |
| 2,648,752 | Saunders | Aug. 11, 1953 |
| 2,693,521 | Alexander | Nov. 2, 1954 |
| 2,703,334 | Clough et al. | Mar. 1, 1955 |
| 2,707,691 | Wheildon | May 3, 1955 |
| 7,756,166 | Alexander et al. | July 24, 1956 |
| 2,822,301 | Alexander et al. | Feb. 4, 1958 |
| 2,866,725 | Alexander | Dec. 30, 1958 |